(12) United States Patent
Biermans et al.

(10) Patent No.: US 7,407,532 B2
(45) Date of Patent: Aug. 5, 2008

(54) PROCESS FOR SEPARATING $NH_3$, AND OPTIONALLY ALSO $CO_2$ AND $H_2O$, FROM A MIXTURE CONTAINING $NH_3$, $CO_2$ AND $H_2O$

(75) Inventors: Andreas Johannes Biermans, Urmond (NL); Kees Jonckers, Roosteren (NL); Johannes Henricus Mennen, Meijel (NL); Nora Anna De Wit, Voerendaal (NL); Herbert Willem Gerrit Hooijkaas, Urmond (NL); Bastiaan Renè Agnes Marie Van De Kerkhove, Eindhoven (NL)

(73) Assignee: DSM IP Assets B.V., Heerlen (NL)

( * ) Notice: Subject to any disclaimer, the term of this patent is extended or adjusted under 35 U.S.C. 154(b) by 366 days.

(21) Appl. No.: 10/541,516

(22) PCT Filed: Jan. 9, 2004

(86) PCT No.: PCT/NL2004/000014

§ 371 (c)(1),
(2), (4) Date: Jul. 8, 2005

(87) PCT Pub. No.: WO2004/067132

PCT Pub. Date: Aug. 12, 2004

(65) Prior Publication Data

US 2006/0112821 A1    Jun. 1, 2006

(30) Foreign Application Priority Data

Jan. 30, 2003    (NL) .................................. 1022526

(51) Int. Cl.
*C01C 1/12*    (2006.01)

(52) U.S. Cl. ............................. 95/236; 203/42; 203/87; 62/617

(58) Field of Classification Search ................... 95/232, 95/236; 203/42, 87; 62/600, 617
See application file for complete search history.

(56) References Cited

U.S. PATENT DOCUMENTS 3,107,149 A    10/1963    Wentworth et al.

(Continued)

FOREIGN PATENT DOCUMENTS

DE    1 592 349    8/1971

(Continued)

OTHER PUBLICATIONS

International Search Report, completed May 27, 2004.

*Primary Examiner*—Frank M. Lawrence
(74) *Attorney, Agent, or Firm*—Nixon & Vanderhye P.C.

(57) ABSTRACT

The invention relates to a process for separating $NH_3$ from a mixture containing $NH_3$, $CO_2$ and $H_2O$ which comprises an $NH_3$ rectification step carried out in a $NH_3$ separation device to which one or more streams containing $NH_3$, $CO_2$ and $H_2O$ including the mixture, are supplied, with a stream consisting substantially of gaseous $NH_3$ being formed in the $NH_3$ separation device, separated from the mixture and discharged. In the process according to the invention a condensation step is carried out on at least one of the stream consisting substantially of gaseous $NH_3$ or the one or more streams containing $NH_3$, $CO_2$ and $H_2O$ supplied to the $NH_3$ separation device, in which at least a part of the existing $CO_2$ is converted to a liquid phase.

7 Claims, 2 Drawing Sheets

U.S. PATENT DOCUMENTS

| | | | |
|---|---|---|---|
| 3,112,177 A | | 11/1963 | Fujise et al. |
| 3,191,916 A | | 6/1965 | Kurpit et al. |
| 3,824,283 A | * | 7/1974 | Harada et al. ................. 564/71 |
| 4,003,801 A | * | 1/1977 | Chikaoka et al. .............. 203/42 |
| 4,012,443 A | * | 3/1977 | Bonetti ........................ 564/66 |
| 4,539,077 A | * | 9/1985 | Jonckers et al. ............... 203/49 |
| 4,540,813 A | * | 9/1985 | van Nassau et al. ........... 564/71 |
| 5,427,759 A | * | 6/1995 | Heitmann ................... 423/352 |

FOREIGN PATENT DOCUMENTS

EP 0 005 292 11/1979

* cited by examiner ured usually lies between 5 and 160° C.

PROCESS FOR SEPARATING $NH_3$, AND OPTIONALLY ALSO $CO_2$ AND $H_2O$, FROM A MIXTURE CONTAINING $NH_3$, $CO_2$ AND $H_2O$

This application is the US national phase of international application PCT/NL2004/000014 filed 9 Jan. 2004 which designated the U.S. and claims benefit of NL 1022526, dated 30 Jan. 2003, the entire content of which is hereby incorporated by reference.

BACKGROUND AND SUMMARY OF INVENTION

The invention relates to a process for separating $NH_3$ from a mixture containing $NH_3$, $CO_2$ and $H_2O$ which comprises an $NH_3$ rectification step carried out in an $NH_3$ separation device to which one or more streams containing $NH_3$, $CO_2$ and $H_2O$, including the mixture, are supplied, with a stream consisting substantially of gaseous $NH_3$ being formed in the $NH_3$ separation device, separated from the mixture and removed.

Such a process is known from NL 7804668 A. In the known process, which can find application in processes for the preparation of melamine or urea or the combined preparation of melamine and urea, the mixture supplied to the $NH_3$ separation device is gaseous or liquid. The $NH_3$ separation device is designed as a distillation device; the energy requirement is met by means of steam. The gaseous $NH_3$ stream that s formed comprises more than 95 wt % $NH_3$ and comprises further inert gases. The gaseous $NH_3$ stream does not contain $CO_2$. The gaseous $NH_3$ stream is partly condensed, with liquid $NH_3$ being formed. The liquid $NH_3$ is returned to the $NH_3$ separation device. The remaining mixture is discharged from the $NH_3$ separation device. In subsequent steps a stream consisting substantially of $CO_2$ and a stream consisting substantially of $H_2O$ can be separated from the mixture.

A disadvantage of the known process is that the $NH_3$ separation device is difficult to control. The composition, pressure and temperature are such that normal fluctuations in the process operation entail the danger of solids being formed. If this takes place, the solids must be removed by flushing with water, as a result of which the efficiency of the $NH_3$ separation device decreases.

It is the object of the invention to reduce said disadvantage.

Said object is achieved in the process according to the invention in that a condensation step is carried out on at least one of the stream consisting substantially of gaseous $NH_3$ or the one or more streams containing $NH_3$, $CO_2$ and $H_2O$ that are supplied to the $NH_3$ separation device, with at least a part of the $CO_2$ that is present being converted to a liquid phase.

An advantage of the process according to the invention is that the danger of solids being formed in the $NH_3$ separation device is less than in the known $NH_3$ separation device. This reduces the need for efficiency-impairing measures such as the said water flushing operation, so that the process is more stable at a lower consumption of energy, for example in the form of steam, and as a result is cheaper.

Without intending to give a theoretical explanation of the advantages of the process according to the invention, it is being assumed that the conversion to a liquid phase of $CO_2$ has such an effect on the ratios in the $NH_3$ rectification step between $NH_3$, $CO_2$ and $H_2O$ and/or the phase in which they are present that there is less danger of solids being formed. In addition, it is being assumed that it is possible to enlarge the operational possibilities of composition, pressure and temperature in the $NH_3$ separation device in such a way that there is less danger of solids being formed.

The process according to the invention is applied to a mixture containing $NH_3$, $CO_2$ and $H_2O$. The ratios between $NH_3$, $CO_2$ and $H_2O$ can vary within wide limits, as can the pressure and the temperature of the mixture. Preferably no solid material is present in the mixture. In addition, the way in which the $NH_3$ rectification step to be discussed hereinafter is carried out may affect the possible ratios between $NH_3$, $CO_2$ and $H_2O$, such as in the case of application of distillation in the $NH_3$ rectification step. In that case it is important, as for example cited in NL 7804668 A, to take into account the known azeotropic nature of mixtures of $NH_3$, $CO_2$ and $H_2O$. As a result, at a given composition and pressure only pure $NH_3$ can be separated using ordinary distillation if the composition is in the so-called $NH_3$-rich range, i.e. range I in FIG. 1 of NL 7804668 A. Analogously, only pure $CO_2$ can be separated using ordinary distillation if the composition is in the $CO_2$-rich range, i.e. range II in FIG. 1 of NL 7804668 A.

If the mixture is present in, or originates from, processes known per se for the preparation of melamine or urea, the mixture generally contains between 20 and 70% $NH_3$, between 10 and 50% $CO_2$ and between 10 and 70% $H_2O$. Preferably the mixture contains between 25 and 60% $NH_3$, between 15 and 40% $CO_2$ and between 20 and 55% $H_2O$. More preferably the mixture contains between 30 and 50% $NH_3$, between 15 and 25% $CO_2$ and between 25 and 50% $H_2O$. Unless stated otherwise, said percentages here and hereinafter are weight percentages.

In the process according to the invention a $NH_3$ rectification step is understood to mean a step, applied to the mixture, in which separation technology is used to form a stream that consists substantially of $NH_3$. In principle every separation technology is suitable which ensures that the stream consisting substantially of gaseous $NH_3$ is formed, separated from the mixture and can be discharged. Examples of possible separation technologies are membrane separation and distillation. Preferably distillation is applied.

It can be useful or necessary for one or more additional streams to be supplied to the $NH_3$ rectification step that influence the thermodynamic equilibrium. An additional stream can also be supplied with the aim of separating $NH_3$ from it, as in the case of the mixture. The additional streams can contain $NH_3$ and/or $CO_2$ and/or $H_2O$. Examples of additional streams are liquid $NH_3$ and recirculation streams from further process steps applied to the mixture. The $NH_3$ rectification step is carried out in an $NH_3$ separation device. If distillation is chosen as the separation technology, the pressures usually lie between 0.1 and 6 MPa, preferably between 0.3 and 4 MPa, more preferably between 0.6 and 3 MPa; the temperature usually lies between 5 and 160° C.

The stream consisting substantially of gaseous $NH_3$ that is formed in the $NH_3$ separation device and separated from the mixture is discharged. Besides $NH_3$ said stream may also contain small quantities of other compounds such as $CO_2$ and $H_2O$; preferably the stream consisting substantially of gaseous $NH_3$ contains less than 15% other compounds, more preferably less than 10%, even more preferably less than 8%, and most preferably less than 5% or even less than 1%. The separation effort required to further reduce the quantity of other compounds can be weighed against the quantity of the other compounds that is allowable in the light of further application of the stream consisting substantially of gaseous $NH_3$. In addition, if allowing a certain quantity of $CO_2$ in the stream consisting substantially of gaseous $NH_3$, for example 5% or less, leads to a simplification or stabilization of the operation of the $NH_3$ separation device, it is advantageous to apply the condensation step according to the invention, which will be discussed later, at least to the stream consisting substantially of gaseous $NH_3$.

In the process according to the invention a condensation step is applied to at least one of the stream consisting substantially of gaseous $NH_3$ or the one or more streams containing $NH_3$, $CO_2$ and $H_2O$ supplied to the $NH_3$ separation device. The condensation step can be carried out by means of techniques known per se. Examples of such techniques are: cooling by means of direct contact with a cooling medium and/or by indirect cooling in a heat exchanger and/or contact with a liquid absorbing medium. At least a part of the $CO_2$ that is present is converted to a liquid phase. The liquid phase may already be present during the condensation step, for example because the condensation step is carried out on a gas/liquid mixture; the liquid phase can also be formed during the condensation step, for example because gaseous $H_2O$ condenses in which the $CO_2$ as well as $NH_3$ is absorbed; the liquid phase may also be supplied, such as the liquid absorbing medium as mentioned above. Preferably between 40% and substantially all $CO_2$ that is present is brought into a liquid phase; more preferably between 50% and substantially all $CO_2$ that is present is converted to a liquid phase, even more preferably between 75% and 99% or 95%.

The process according to the invention can be applied with the aim of obtaining the stream consisting substantially of gaseous $NH_3$ from the mixture. It may in addition be desirable to also free $CO_2$ and $H_2O$ from the mixture, besides $NH_3$. The process according to the invention therefore further preferably comprises, in order to separate $CO_2$ and $H_2O$ from the mixture:

a $CO_2$ rectification step, which is applied in a $CO_2$ separation device to the mixture coming from the $NH_3$ separation device while a stream coming from a desorption device is supplied, with a stream consisting substantially of $CO_2$ being formed in the $CO_2$ separation device and being separated from the mixture, and a desorption step, which is applied in the desorption device to the mixture coming from the $CO_2$ separation device, with a stream consisting substantially of $H_2O$ being formed and being separated from the mixture, after which the mixture is returned to the $NH_3$ separation device and/or the $CO_2$ separation device.

The $CO_2$ rectification step can be carried out with the aid of techniques known per se, in a $CO_2$ separation device. Examples of such a technique are membrane separation and distillation. In the case of distillation the stream consisting substantially of $CO_2$ is the top product. If distillation is applied to the mixture and, as will usually be the case, mainly $NH_3$, $CO_2$ and $H_2O$ are present, it is to be expected that account must be taken of the azeotropic behaviour mentioned earlier. The composition in the $CO_2$ separation device, this being the device in which the $CO_2$ rectification step is carried out, must be in the $CO_2$-rich range at the prevailing pressure. If the composition of the mixture supplied from the $NH_3$ separation device, also taking into account the composition of the stream coming from the desorption step, will result in the composition in the $CO_2$ separation device being outside the $CO_2$-rich range, an additional measure is necessary. Examples of such additional measures are: a change in pressure, for example a pressure increase, and/or a change in composition, for example by supplying an additional stream such as an $H_2O$ stream. If a pressure increase is applied the pressure in the $CO_2$ separation device usually lies between 0.5 and 10 MPa, more preferably between 1 and 6 MPa and in particular between 1.5 and 5 MPa. The top temperatures in the $CO_2$ separation device then usually lie between 30 and 175° C., preferably between 100 and 150° C., the bottom temperatures usually between 100 and 250° C., preferably between 150 and 200° C.

As indicated above, from the $CO_2$ rectification step a stream consisting substantially of $CO_2$ is released. In addition the mixture is released; the mixture is removed from the $CO_2$ separation device and subsequently supplied to the desorption device where the desorption step is carried out. The aim of the desorption step is to free a stream consisting substantially of $H_2O$ from the mixture. This can take place with the aid of techniques known per se, such as with distillation, in which case the stream consisting substantially of $H_2O$ is the bottom product. After a stream consisting substantially of $H_2O$ has been separated from the mixture in the desorption step, the remaining quantity of the mixture, which still contains $NH_3$, $CO_2$ and $H_2O$, is returned to the $NH_3$ separation device and/or the $CO_2$ separation device.

In this embodiment the condensation step according to the invention is carried out on the stream consisting substantially of gaseous $NH_3$ from the $NH_3$ separation device and/or on at least a part of the stream that comes from the desorption device and that is supplied to the $NH_3$ separation device.

In a special embodiment of the invention the desorption step is carried out in two desorption zones, one zone being operated at a pressure that is almost equal to the pressure in the $NH_3$ separation device and the second one at a pressure that is almost equal to the pressure in the $CO_2$ separation device. The streams leaving the desorption zones are transferred to the two separation devices at the practically corresponding pressures. It was found that this can yield a reduction in steam consumption.

If the condensation step according to the invention is applied to the stream consisting substantially of gaseous $NH_3$, this is done preferably in a submerged condenser with an aqueous stream and/or liquid $NH_3$ being supplied as absorbing medium. A submerged condenser is known per se, for example from NL 8400839 A. The aqueous stream consists substantially of water but may in addition also contain other compounds; examples are $NH_3$, $CO_2$, ammonium carbamate, melamine or urea. In the submerged condenser the stream consisting substantially of gaseous $NH_3$ comes into direct contact with the also supplied aqueous stream and/or liquid $NH_3$, in which $CO_2$ will absorb. This has the advantage that less stringent requirements are specified for the $CO_2$ removal in the $NH_3$ separation device than in the known process, which enhances the operational stability and reduces the risk of solids being formed. As stated earlier, the formation of solids leads to steam consumption that is occasionally and/or structurally higher. Also, through the choice of the feed streams and their temperatures, optimum heat transfer and mass transfer conditions can be chosen, which is especially favourable as regards the transition of $CO_2$ from the gas phase to the liquid phase in the submerged condenser.

If the stream consisting substantially of gaseous $NH_3$, after leaving the submerged condenser and as a result of the contact with the aqueous stream, contains an undesirable quantity of $H_2O$, preferably an absorption step is applied to the stream consisting substantially of gaseous $NH_3$, in which said stream is brought into contact with liquid $NH_3$. As a result, the $H_2O$ will be absorbed in the liquid $NH_3$. The absorption step can be carried out with the aid of techniques known per se, for example in a plate column.

In another embodiment of the condensation step according to the invention this step is carried out as a partial condensation step on the stream that comes from the desorption device and that is supplied to the $NH_3$ separation device. The partial condensation step is preferably carried out by means of indirect cooling with a cooling medium, in for example a heat exchanger. The stream coming from the desorption device also contains $H_2O$ and $NH_3$; as a result of the partial condensation step at least a part of the $H_2O$ will become liquid, in which a part of the $CO_2$ is absorbed as well as a part of the $NH_3$. As a result, operation of the $NH_3$ separation device becomes simpler, and more stable on account of a smaller risk of solids being formed. Preferably the mixture present in the $NH_3$ separation device is used as cooling medium in the partial condensation step.

BRIEF DESCRIPTION OF THE DRAWINGS

The process according to the invention is explained further on the basis of the drawings.

In the drawings

The first digit of the numbers in the figures is the same as the number of the figure. If the last two digits of the numbers of different figures agree, the parts are the same.

DETAILED DESCRIPTION OF PREFERRED EMBODIMENTS

Figure 1:
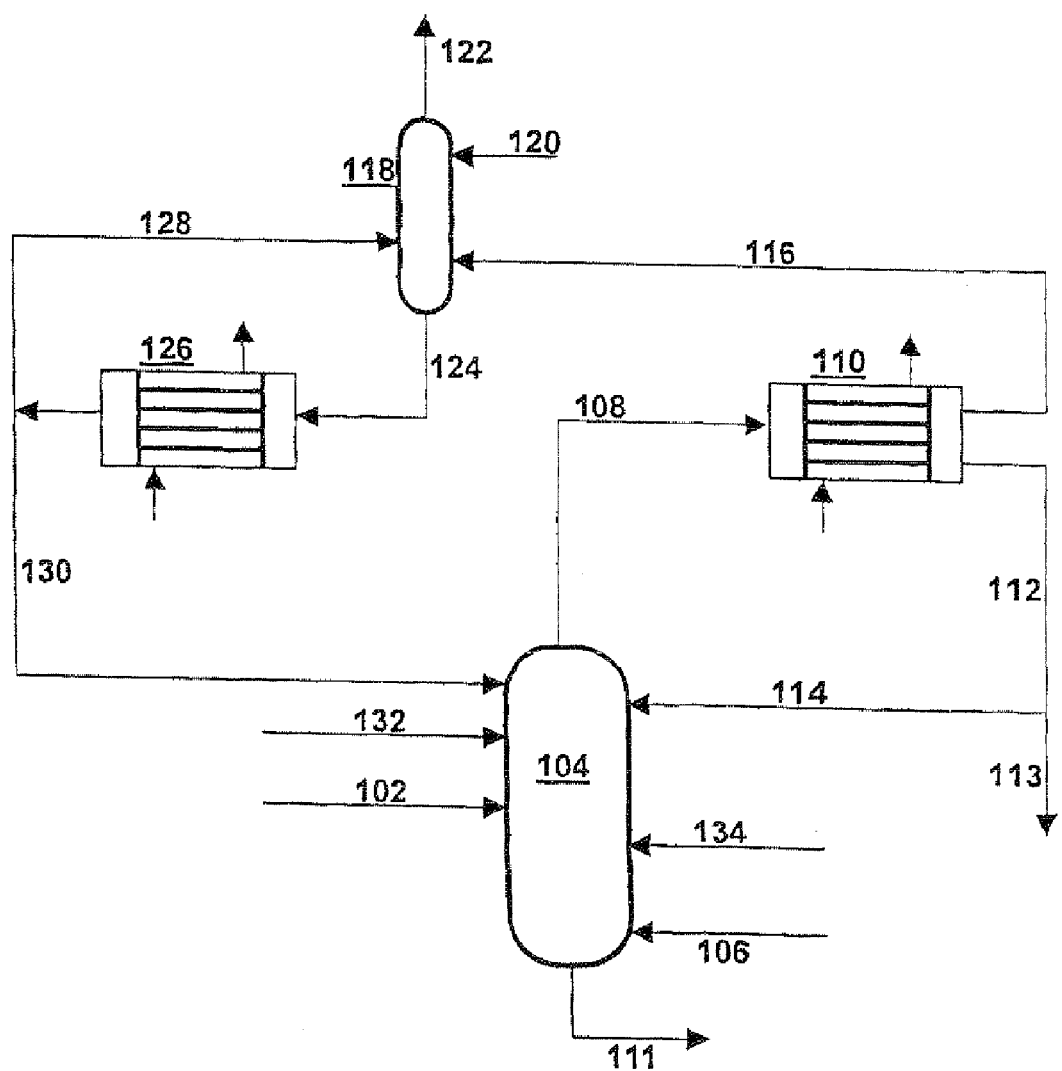
FIG. 1 shows an embodiment according to the known state of the art, in which a stream consisting substantially of gaseous $NH_3$ is separated from a gaseous a mixture of $NH_3$, $CO_2$ and $H_2O$ in an absorber.

In FIG. 1 a mixture of $NH_3$, $CO_2$ and $H_2O$ is supplied via line 102 to $NH_3$ separation device 104, which is designed as a distillation column and is preferably operated at a temperature between 15-160° C. and at a pressure between 0.1 and 6 MPa. Air is also supplied to the $NH_3$ separation device 104, via line 106, to protect the equipment against corrosion. The stream consisting substantially of gaseous $NH_3$ is discharged via line 108 to ammonia cooler 110; the mixture is discharged as a liquid solution of $NH_3$ and $CO_2$ in water via line 111 and transferred to a $CO_2$ separation device—not drawn. In ammonia cooler 110 almost all $NH_3$ is liquefied and discharged via line 112, partly to be recirculated via line 114 to $NH_3$ separation device 104, partly via 113 to be used elsewhere. From ammonia cooler 110 there also comes a gas phase, which consists substantially of inert gases and some $NH_3$ and which is conveyed via line 116 to scrubber 118. In scrubber 118 the stream from line 116 is brought into contact with scrubbing water, a stream consisting substantially of water, which is supplied via line 120, as a result of which the $NH_3$ is absorbed in the scrubbing water, a solution of $NH_3$ in water being formed. The inert gases are discharged via line 122; the solution of $NH_3$ in water is fed via line 124 to cooler 126, and afterwards partly recirculated via line 128 to scrubber 118, and partly recirculated via line 130 to $NH_3$ separation device 104, which is further fed via line 132 with a stream of $H_2O$ and via line 134 with mixture from the desorption device, which is not shown. The stream of $H_2O$ which is supplied via line 132 serves substantially to prevent solids being formed in the $NH_3$ separation device 104 or for flushing thereof in case that solids formation has still taken place.

Figure 2:
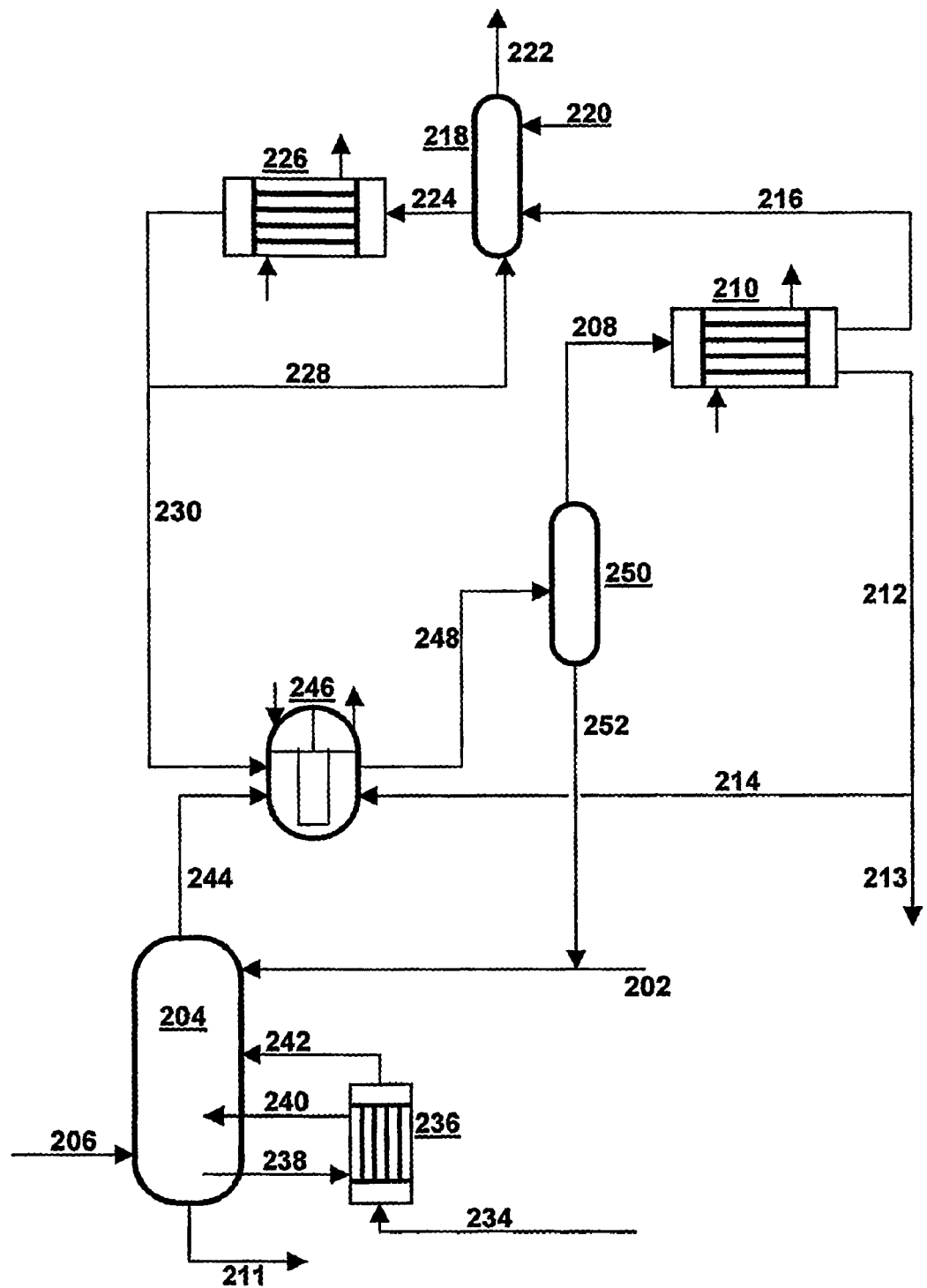
FIG. 2 shows an embodiment according to the invention, in which the condensation step is carried out on both the stream consisting substantially of gaseous $NH_3$ and on the stream that comes from the desorption device and that is supplied to the $NH_3$ separation device.

In FIG. 2 a mixture of $NH_3$, $CO_2$ and $H_2O$ is fed via line 202 to $NH_3$ separation device 204; the mixture supplied via 234 from the desorption device is subjected to the partial condensation step according to the invention in cooler 236. As cooling medium use is made of mixture from the $NH_3$ separation device 204, supplied via line 238, after which the mixture is returned to the $NH_3$ separation device 204 via 240. The partly condensed mixture from the desorption device is supplied via line 242 to the $NH_3$ separation device 204. The stream consisting substantially of gaseous $NH_3$ is fed via line 244 to submerged condenser 246, were it is brought into contact with a part of the solution of $NH_3$ in water coming from cooler 226, and with a stream of liquid $NH_3$ supplied via 214, this resulting in the formation of a gas/liquid mixture that is supplied to gas/liquid separator 250 via line 248. In separator 250 the liquid phase is separated and discharged via line 252, after which the liquid phase is combined with the mixture that is supplied via 202; the gas phase is separated, discharged and supplied to ammonia cooler 210 via line 208.

The process according to the invention is explained further on the basis of a comparative experiment and an Example. The comparative experiment was performed according to the embodiment of FIG. 1; the Example was performed according to the embodiment of FIG. 2. The results are shown in the following tables.

TABLE 1

Results of the comparative experiment (see FIG. 1)

| Stream | P (MPa) | T (° C.) | $NH_3$ (kg/h) | $CO_2$ (kg/h) | $H_2O$ (kg/h) | $N_2$ (kg/h) | $O_2$ (kg/h) | Total (kg/h) |
|---|---|---|---|---|---|---|---|---|
| 102 | 3 | 50 | 350 | 200 | 450 | | | 1000 |
| 106 | 2 | 80 | | | | 4 | 1 | 5 |
| 108 | 2 | 50 | 680 | | | 10 | 3 | 693 |
| 111 | 2 | 136 | 320 | 250 | 660 | | | 1230 |
| 113 | 2 | 40 | 350 | | | | | 350 |
| 114 | 2 | 40 | 300 | | | | | 300 |
| 130 | 2 | 50 | 30 | | 30 | | | 60 |
| 132 | 2 | 50 | | | 60 | | | 60 |
| 134 | 3 | 175 | 320 | 50 | 120 | 6 | 2 | 498 |

The total quantity of steam of 4 MPa and 430° C. required in the comparative experiment was 700 kg/h. In order to prevent the formation of solids during operation, it was necessary to supply a stream of water via 132.

TABLE 2

Results of the example (see FIG. 2)

| Stream | P (MPa) | T (° C.) | $NH_3$ (kg/h) | $CO_2$ (kg/h) | $H_2O$ (kg/h) | $N_2$ (kg/h) | $O_2$ (kg/h) | Total (kg/h) |
|---|---|---|---|---|---|---|---|---|
| 202 | 3 | 50 | 350 | 200 | 450 | | | 1000 |
| 206 | 2 | 80 | | | | 4 | 1 | 5 |
| 208 | 2 | 50 | 450 | | | 10 | 3 | 463 |
| 211 | 2 | 135 | 300 | 250 | 600 | | | 1150 |
| 213 | 2 | 40 | 350 | | | | | 350 |
| 214 | 2 | 40 | 70 | | | | | 70 |
| 230 | 2 | 50 | 30 | | 50 | | | 80 |
| 232 | | | | | 0 | | | 0 |
| 234 | 3 | 170 | 300 | 50 | 100 | 6 | 2 | 458 |
| 242 (gas) | 3 | 135 | 230 | 20 | 15 | 6 | 2 | 273 |
| 242 (liquid) | 3 | 135 | 70 | 30 | 85 | | | 185 |
| 244 | 2 | 100 | 530 | 10 | 20 | 10 | 3 | 573 |
| 252 | 2 | 50 | 180 | 10 | 70 | | | 260 |

The quantity of steam of 4 MPa and 430° C. required in the comparative experiment was 650 kg/h. During plant operation it was found that in the Example no formation of solids occurred, although no stream of water was supplied via 232 as was necessary in the comparative experiment. This proves the stabilizing effect of the condensation step according to the invention. In addition the quantity of required steam proves to be lower in the Example than in the comparative experiment, although the same quantity mixture is processed. This lower steam requirement is an additional advantage of the process according to the invention.

The invention claimed is:

1. Process for separating $NH_3$ from a mixture containing $NH_3$, $CO_2$ and $H_2O$ which comprises an $NH_3$ rectification step carried out in an $NH_3$ separation device to which one or more streams containing $NH_3$, $CO_2$ and $H_2O$, including the mixture, are fed from elsewhere in the process, with a stream consisting substantially of gaseous $NH_3$ being formed in the $NH_3$ separation device, separated from the mixture and discharged, wherein a condensation step is carried out in a condenser separate from the $NH_3$ separation device on at least one of the stream consisting substantially of gaseous $NH_3$ or the one or more streams containing $NH_3$, $CO_2$ and $H_2O$ supplied to the $NH_3$ separation device, in which at least a part of the existing $CO_2$ is converted to a liquid phase.

2. Process according to claim 1, in which the condensation step is carried out by cooling the stream to be condensed and/or bringing it into contact with an absorbing medium.

3. Process according to claim 1, the process further comprising, in order to separate $CO_2$ and $H_2O$ from the mixture:
a $CO_2$ rectification step, which is applied in a $CO_2$ separation device to the mixture coming from the $NH_3$ separation device while a stream coming from a desorption device is supplied, with a stream consisting substantially of $CO_2$ being formed in the $CO_2$ separation device and being separated from the mixture, and
a desorption step, which is applied in the desorption device to the mixture coming from the $CO_2$ separation device, with a stream consisting substantially of $H_2O$ being formed and being separated from the mixture, after which the mixture is returned to the $NH_3$ separation device and/or the $CO_2$ separation device,
in which the condensation step is carried out on the stream consisting substantially of gaseous $NH_3$ from the $NH_3$ separation device and/or on at least a part of the stream that comes from the desorption device and that is supplied to the $NH_3$ separation device.

4. Process according to claim 1, in which the condensation step is carried out on the stream consisting substantially of gaseous $NH_3$ from the $NH_3$ separation device in a submerged condenser while an aqueous stream and/or liquid $NH_3$ is supplied as absorbing medium.

5. Process according to claim 4, in which after the condensation step an absorption step is applied to the stream consisting substantially of gaseous $NH_3$, in which the said stream is brought into contact with liquid $NH_3$.

6. Process according to claim 1, in which the condensation step is carried out as a partial condensation step, by means of indirect cooling with a cooling medium, on a stream that comes from a desorption device and is supplied to the $NH_3$ separation device.

7. Process according to claim 6, in which the mixture present in the $NH_3$ separation device is used as cooling medium in the partial condensation step.

* * * * *